Feb. 2, 1932.   K. E. LYMAN   1,843,571
BRAKE
Filed Oct. 12, 1928
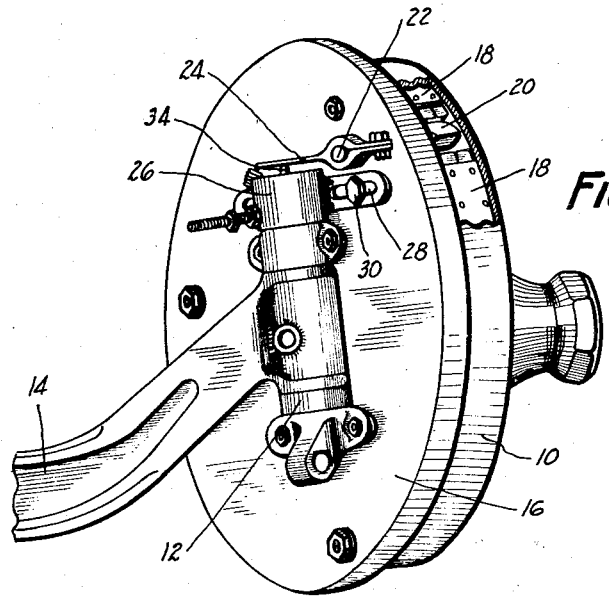
FIG.1
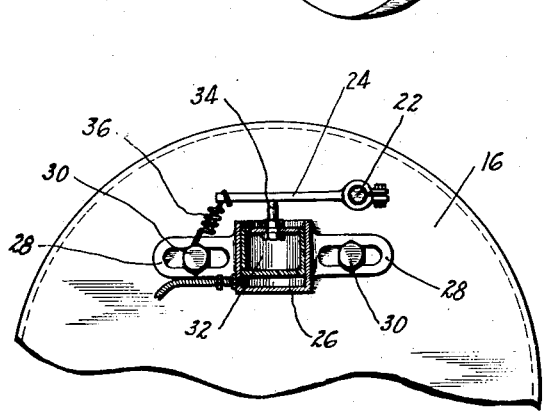
FIG.3
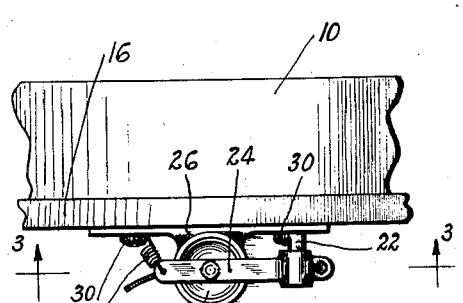
FIG.2
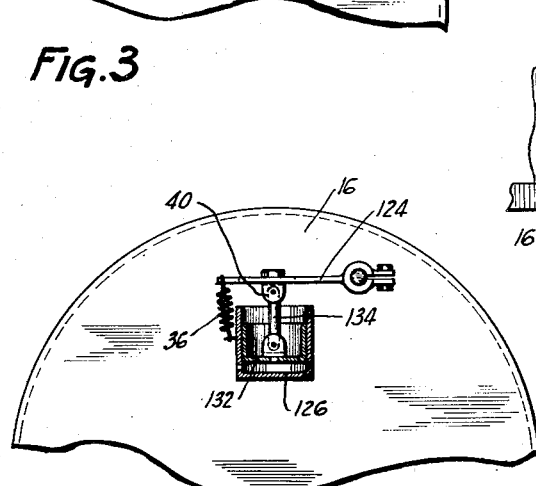
FIG.5
FIG.4
INVENTOR
KENNETH E. LYMAN
BY
ATTORNEY Patented Feb. 2, 1932

1,843,571

UNITED STATES PATENT OFFICE

KENNETH E. LYMAN, OF ROCKFORD, ILLINOIS, ASSIGNOR TO BENDIX BRAKE COMPANY, OF SOUTH BEND, INDIANA, A CORPORATION OF ILLINOIS

BRAKE

Application filed October 12, 1928. Serial No. 312,006.

This invention relates to brakes, and is illustrated as embodied in hydraulically-operated automobile brakes. An object of the invention is to provide for adjusting a brake of the fluid-power type, in which the power applied to the various brakes of a car is necessarily equalized, to vary the mechanical advantage of the applying means at the brake, thus compensating for the greater or lesser effectiveness of the particular brake.

In one desirable arrangement, the fluid-power operator is adjusted along a lever forming part of a mechanical applying device at the brake, for example by mounting the operator for bodily adjustment on the backing plate of the brake.

The above and other objects and features of the invention, including various novel and desirable details of construction, will be apparent from the following description of the illustrative embodiments shown in the accompanying drawings, in which:

Figure 1 is a perspective view, partly broken away, showing the left front brake and the adjacent portion of the front axle;

Figure 2 is a partial top plan view of the brake shown in Figure 1;

Figure 3 is a partial section, on the line 3—3 of Figure 2, showing the adjustable mounting of the fluid-power operator;

Figure 4 is a partial plan view corresponding to Figure 2, but showing a modification; and Figure 5 is a partial section on the line 5—5 of Figure 4, and corresponding to Figure 3, and showing the adjustment of the modified form.

The arrangement shown in Figure 1 includes a rotatable drum 10 mounted, with a road wheel, on a knuckle 12 swiveled at one end of the front axle 14. A support, such as a backing plate 16 bolted to the knuckle 12, is arranged at the open side of the drum. The friction means of the brake includes shoes 18 within the drum, controlled by a mechanical applying device including a brake-applying cam 20 having a shaft 22 extending through the backing plate and provided with an operating lever 24.

The fluid-power applying device includes a cylinder 26 having side portions engaging the backing plate and formed with slots 28, through which pass bolts 30 adjustably securing the cylinder to the backing plate. A piston 32 within the cylinder has a thrust member 34 engaging the lower face of the lever 24. A return spring 36 may be tensioned between lever 24 and cylinder 26. It will be seen that the entire fluid-power device may readily be shifted bodily along the lever 24 to make the desired adjustment.

In the arrangement of Figures 4 and 5, lever 124 is provided with a slot 128 for being adjustably secured to a fitting 40 connected by a rigid pivoted link 134 to a piston 132 in a cylinder 126 fixedly mounted on the backing plate. In this case the fitting 40 is shifted to make the desired adjustment.

While two illustrative embodiments have been described in detail, it is not my intention to limit the scope of the invention to those particular embodiments, or otherwise than by the terms of the appended claims.

I claim:

1. A brake comprising, in combination, a mechanical applying device including a lever, and a fluid-power operating device acting on said lever and adjustable along said lever to vary the mechanical advantage in applying the brake.

2. A brake comprising, in combination, a brake-applying cam having a lever, and a fluid-power operating device acting on said lever and adjustable along said lever to vary the mechanical advantage in applying the brake.

3. A brake comprising, in combination, a mechanical applying device including a lever, and a fluid-power operating device acting on said lever and adjustable along said lever to vary the mechanical advantage in applying the brake, together with a return spring tensioned between said lever and said fluid-power device.

4. A brake comprising, in combination, a backing plate, an applying device carried by the backing plate and having a lever adjacent said plate, a fluid-power device acting on said lever and having slotted portions engaging said plate, and attaching bolts passing through said slotted portions and adjustably securing the fluid-power device to the backing plate.

5. A brake comprising, in combination, a backing plate, an applying device carried by the backing plate and having a lever adjacent said plate, a fluid-power device acting on said lever, and attaching means adjustably securing the fluid-power device to the backing plate.

In testimony whereof, I have hereunto signed my name.

KENNETH E. LYMAN.